Sept. 8, 1942.　　　　　R. L. LEVY　　　　　2,294,918
RETRACTABLE UNDERCARRIAGE FOR AIRPLANES AND THE LIKE
Filed July 31, 1939
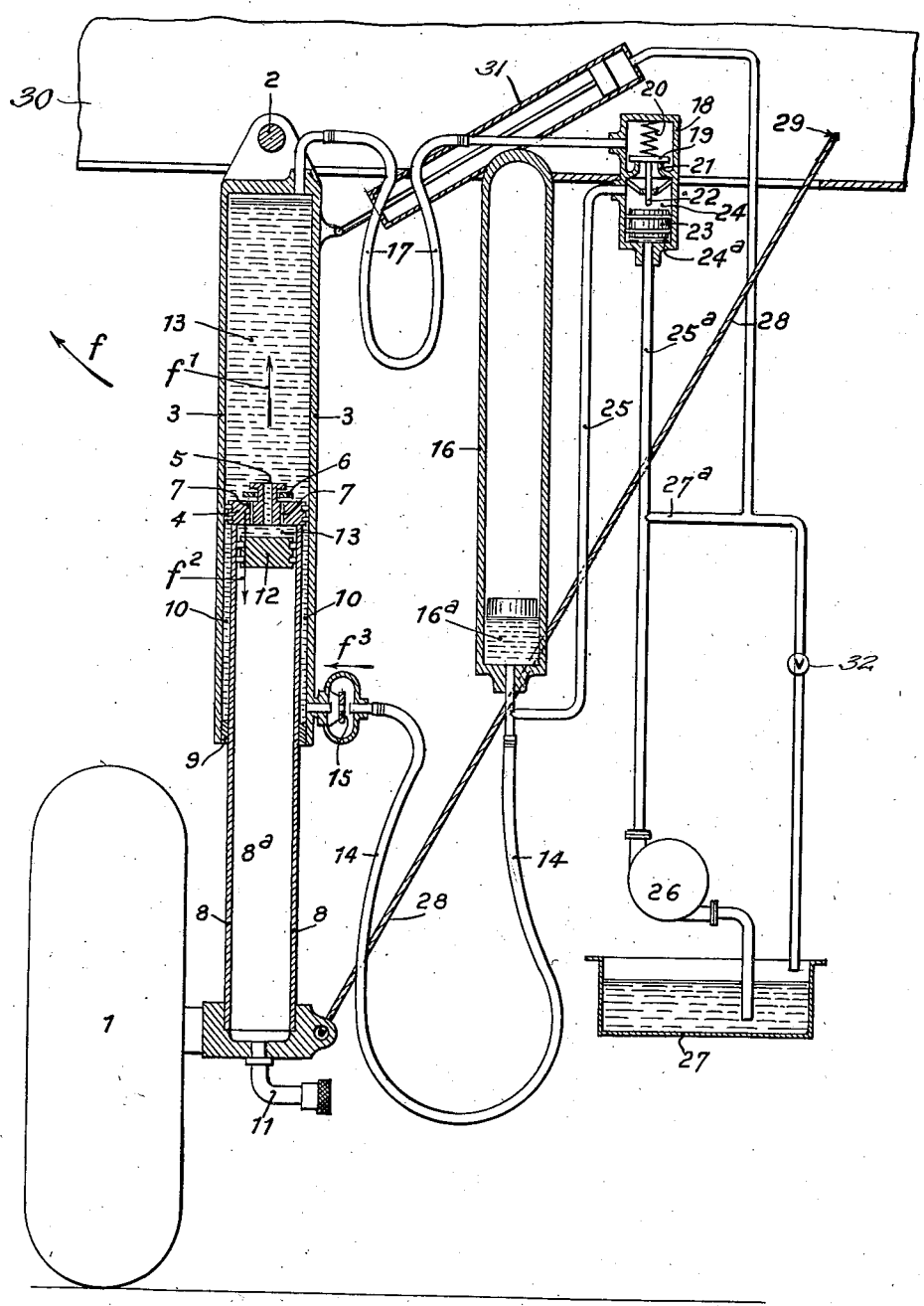
Inventor,
R. L. Levy
By: Glascock Downing & Seebold
Attys.

Patented Sept. 8, 1942

2,294,918

UNITED STATES PATENT OFFICE 2,294,918

RETRACTABLE UNDERCARRIAGE FOR AIRPLANES AND THE LIKE

René Lucien Levy, Montrouge, France, assignor to Société d'Inventions Aéronautiques et Mécaniques, S. I. A. M., Fribourg, Switzerland Application July 31, 1939, Serial No. 287,635
In France July 26, 1938

2 Claims. (Cl. 244—102)

The present invention relates to a retractable landing gear for an airplane.

In certain types of airplanes provided with a retractable undercarriage, it is necessary, in order to lodge the retracted undercarriage in the airplane, for the length of said undercarriage, between the pivotal axis and the wheels, to be more reduced in the retracted position than in the extended position.

One solution of this problem, for undercarriages in which the suspension device forms part of the retractable system, consists in connecting the movable element of this shock-absorbing device to a fixed point of the airplane by a connection of fixed length, such as a cable, so that the lifting of the undercarriage causes the retraction of the shock-absorber and, consequently, the desired decrease of length.

Such a method of control must however be compatible with the structure of the suspension device inasmuch as this reduction of length must not be greater than the maximum retraction that can be supported by the shock-absorber and must not require an excessive expenditure of energy for effecting it.

The present invention has for its object to provide a device which fulfills these particular conditions of retraction and said device is mainly characterized by the fact that the chamber which, in the shock-absorber, contains the liquid that reacts during the compression stroke, is connected to a receptacle by a pipe provided with a valve which is normally closed and the opening of which is effected either by the pilot, or automatically. In this latter method of control, it is possible, optionally, to use the hydraulic pressure that is used for the retraction.

The receptacle which receives the liquid forced back by the retraction of the undercarriage during the lifting may be open to the atmosphere, or on the contrary may form a closed air bell.

The invention relates, in particular, to undercarriages having an oleo-pneumatic suspension device of the so-called "two liquid" type, if this designation is applied to shock-absorbers in which the piston is movable between two liquid layers bathing each of its faces, one of said layers acting to brake the movement of the piston during the compression stroke, the other during the expansion stroke.

The invention is illustrated in the accompanying drawing wherein the single figure is an elevational view partly in section.

For the retraction, the wheel 1 carried by the strut forming a shock-absorber pivots with same about the pivot 2, for example in the direction shown by the arrow $f$. The pivot pin 2 is fixed to a suitable part of an airplane shown generally at 30. The shock-absorber comprises a cylinder 3 having a piston 4 which is provided with a constantly open narrow orifice 5 and with a valve 6 that is movable opposite other orifices 7 which are thus closed or opened according to whether the piston moves in the direction of the arrow $f^1$ or $f^2$.

The piston 4 is provided with a hollow rod 8 by means of which it is rigidly connected to the wheel and relatively to which the cylinder 3 can slide in a fluid-tight manner owing to the presence of appropriate packings 9, an annular space 10 filled with liquid being thus provided between the hollow rod 8 and the cylinder.

In the hollow rod 8, compressed air is initially introduced at a predetermined pressure through an inflation orifice 11. A floating piston 12 separates this compressed air cushion from the liquid 13 located above said piston in the upper compartment of the cylinder.

The liquid contained in the annular space 10 communicates, through a hose 14 provided with a valve 15, with an air bell 16.

The valve 15 is such that it readily allows the liquid to pass in the direction of the arrow $f^3$, but only offers a narrow orifice for the circulation in the opposite direction.

According to the invention the upper part of the cylinder 3 is connected by a pipe 17 to a valve box 18. The valve box 18 is provided with a chamber in which a valve 19 is arranged. The valve 19 is yieldably urged to a closed position on a seat 21 by means of a spring 20. A stem 22 of the valve is adapted to be engaged by a floating piston 23.

A compartment 24 on one side of the piston 23 is connected by a pipe 25 to the air bell 16. A compartment 24a at the opposite face of the piston 23 is connected to the delivery side of a retracting pump 26 by means of a pipe 25a. The pump is supplied with liquid from a tank 27. A pipe 27a extends from the pipe 25a for supplying fluid pressure to a retracting jack 31.

It will be readily seen that the strut formed of the cylinder 3 and the hollow rod 8 normally performs the function of a shock-absorber, so long as the pump 26 is not operating.

Under these conditions the compression stroke of the shock-absorber occurs when the piston 4 moves in the direction of the arrow $f^1$. The liquid which is forced by the piston into the upper compartment, can only escape through the orifice 5 and pushes the piston 12 downwards, increasing the pressure of the compressed air contained in the chamber 8a.

At the same time, the liquid 16a of the bell has free access through the valve 15 to fill the annular space 10 as the volume of said space increases.

During the expansion stroke, the piston 4 moves in the direction of the arrow f², the liquid contained in the space 10 is forced through the narrow orifice of the valve 15 into the bell 16, while the liquid located immediately above the piston 12 flows freely back into the upper compartment of the cylinder 3, through the orifice 5 and the orifices 7 uncovered by the valve 6.

It will therefore be seen that the narrow orifice 5 for the compression stroke, and the orifice of the valve 15 for the expansion stroke, ensure the hydraulic braking of the shocks received by the shock-absorber during travel along the ground, whereas the resilient suspension is ensured by the pneumatic chamber 8a.

During the retraction, the pump 26 having been started, the valve 19 is pushed back by the piston 23 and opens. At the same time, the liquid delivered by the pump actuates, through the pipe 27a, the driving jack for the retraction, so that the strut formed of the members 3 and 8 pivots about the pin 2.

As the piston rod 8 is connected by a cable 28 to a suitably located fixed point 29 of the airplane, said rod is urged, during this retracting movement, to enter the cylinder 3 and move in the direction of the arrow f¹ within said cylinder.

Without the valve box 18, this retraction of the shock-absorber would be braked by the normal operation of same and the consequent compression in the chamber 8a might attain a magnitude incompatible with the power available for effecting the retraction.

The invention eliminates these drawbacks by the opening of the valve 19 which is immediately brought about by the starting of the pump 26, so that the liquid forced by the piston 4 into the pipe 17 can pass through the open valve 19 and through the pipe 25, and be stored in the base of the bell 16. A part of the liquid thus delivered compensates for the increase of volume of the annular space 10 during this movement of the piston 4. However, since the volume of the liquid delivered by the piston 4 is greater than the increase of volume of the space 10, the pressure consequently increases in the bell 16.

The volume of said bell will be chosen sufficiently large for the pressure, after retraction, to remain still very low.

During the retraction of the undercarriage, the piston 12 does not move in the hollow rod 8, the pressure at 8a being very much greater than the resistances encountered by the liquid 13 forced towards the valve box and the bell.

In the retracted position, the undercarriage is held by the pressure produced in the pipes 25a and 27a which acts on the retracting jack of said undercarriage.

However, the pressure that prevails above the liquid 16a acts differentially on the piston 4, since the stress which corresponds to said pressure is greater on the upper face of the piston 4 than on the peripheral ring corresponding to the annular space 10 on the opposite face.

The pressure that prevails in the bell 16 therefore tends to drive the piston 4 out of the shock-absorber and, consequently, to cause the undercarriage to be lowered by reaction on the cable 28.

This reaction which effects the lowering only exists, in the retracted position, if the cable 28 during its movement constantly remains below a line extending through the fixed pivots 2 and 29.

In order to lower the undercarriage, the pipes 25a and 27a are placed in direct communication with the tank 27 by means of a valve 32. The undercarriage is then no longer held and begins to move downwards. During this downward movement, the liquid 16a which passes through the valve 19 returns at 13 into the upper chamber of the shock-absorber cylinder.

Finally, all the liquid which was driven into the bell 16 during the previous retraction, flows through the pipes 25 and 17 and gradually fills said chamber until the shock-absorber piston 4 reaches the end of its outward stroke.

I claim:

1. In a retractable undercarriage for an airplane having a retracting mechanism, a landing member, a telescopic shock absorber for said landing member, a pivot for connecting the shock absorber to the airplane whereby the shock absorber may turn on the pivot to swing the landing member to a retracted position, a linkage secured to the airplane and the shock absorber for decreasing the length of the shock absorber during the retraction of the landing member, a piston in said shock absorber providing a chamber on each side thereof, an auxiliary container, a pipe connecting one chamber of the shock absorber with said container, a normally closed valve interposed in said pipe when the shock absorber is in a landing position, a pipe connecting said auxiliary container with the other chamber of said shock absorber, a pump for retracting the landing member, and means for opening said valve at the instant when the shock absorber starts to swing to a retracted position.

2. In a retractable undercarriage for an airplane having a retracting mechanism, a landing member, a telescopic shock absorber for said landing member, a pivot for connecting the shock absorber to the airplane whereby the shock absorber may turn on the pivot to swing the landing member to a retracted position, a linkage secured to the airplane and the shock absorber for decreasing the length of the shock absorber during the retraction of the landing member, a piston in said shock absorber providing a chamber on each side thereof, an auxiliary container, a pipe connecting one chamber of the shock absorber with said auxiliary container, a valve in said pipe closing the same when the shock absorber is in a landing position, a pipe connecting said auxiliary container with the other chamber of the shock absorber, a pump for retracting the landing member, and means movable upon starting of the pump for opening said valve.

RENÉ LUCIEN LEVY.